United States Patent
Li et al.

(10) Patent No.: US 7,301,128 B2
(45) Date of Patent: Nov. 27, 2007

(54) PORTABLE ELECTRIC GRILL

(76) Inventors: George T. C. Li, 2533 N. Carson St., Suite #893, Carson City, NV (US) 89706; William Terry Robertson, Jr., 1546 Crossing Way, Auburn, AL (US) 36830

( * ) Notice: Subject to any disclaimer, the term of this patent is extended or adjusted under 35 U.S.C. 154(b) by 0 days.

(21) Appl. No.: 11/047,248

(22) Filed: Jan. 29, 2005

(65) Prior Publication Data

US 2006/0191895 A1  Aug. 31, 2006

(51) Int. Cl.
*H05B 3/68* (2006.01)
*H05B 3/06* (2006.01)

(52) U.S. Cl. .................. 219/450.1; 219/465.1; 219/524

(58) Field of Classification Search .......... 219/445.1, 219/446.1, 448.11, 450.1, 451.1, 455.11, 219/465.1, 468.2, 524, 525; 99/372, 373, 99/374, 375, 376, 377, 378, 379, 422, 425
See application file for complete search history.

(56) References Cited

U.S. PATENT DOCUMENTS

| | | | | |
|---|---|---|---|---|
| 2,105,814 A | * | 1/1938 | Lent | 219/452.13 |
| 3,172,999 A | * | 3/1965 | Sutton et al. | 219/524 |
| 3,281,577 A | * | 10/1966 | Altemiller | 219/524 |
| 3,593,648 A | * | 7/1971 | Walters | 99/349 |
| 3,712,819 A | | 1/1973 | Field | 99/400 |
| 3,971,877 A | * | 7/1976 | Lee | 174/16.1 |
| 4,034,663 A | | 7/1977 | Jenn et al. | 99/446 |
| 4,226,177 A | | 10/1980 | Schmidt | 99/372 |
| 4,468,548 A | * | 8/1984 | Yamaki | 219/601 |
| 4,475,528 A | | 10/1984 | Kuchenbrod | 126/9 R |
| 6,433,312 B1 | * | 8/2002 | Chen | 219/386 |
| 6,526,873 B2 | * | 3/2003 | Brady | 99/332 |

* cited by examiner

*Primary Examiner*—Sang Y. Paik

(57) ABSTRACT

A portable electric grill including an exhaust fan for indoor grilling is disclosed. The present grill is constructed to permit its supporting frame to be folded from an open position wherein the horizontally disposed grilling plates are supported by folding leg members to a closed position wherein the grilling plates are folded vertically along with the leg members for convenient portability and storage. The present grill also provides heating elements associated with each grilling plate, which permits the grilling plates to be selectively energized. An air filter is disposed within the air intake of the exhaust fan utilizing filter media capable of capturing particulate matter of a size range found in smoke and cooking fumes generated by the grill during operation.

24 Claims, 8 Drawing Sheets

PORTABLE ELECTRIC GRILL

BACKGROUND OF INVENTION

The present invention relates to cooking appliances and, more particularly, to a portable electric grill, which is ventilated for indoor cooking and is also foldable for convenient transport and storage.

There are several U.S. patents that are available in the field of portable cooking grills, however, none of them address the long felt need in the manner of the present invention. For example, U.S. Pat. No. 4,034,663 to Jenn et al. discloses one such ventilated portable electric grill. This grill assembly includes a heating element and is topped by a grill element. An upwardly extending portion of the grill housing encloses a power driven fan, which draws air, smoke, and cooking vapors from across the grill element. The fan outlet discharges to the exterior of the housing. The present invention is patentably distinct from this prior art cooking grill because it is foldable for convenient storage and provides other novel structural features to support this functionality.

Another example of a ventilated electric grill is described in U.S. Pat. No. 3,712,819 to Field, which discloses a ventilated open-air indoor broiler having damper means. This grill provides electric heating elements and a positionable damper located at the entrance to an air plenum chamber adjacent the broiler. Air is drawn across the surface of the broiler grill and past the damper means to the plenum and exhausted via an electric fan to the atmosphere by ducting. The present invention is also patentably distinct from this prior art cooking grill due to its foldable construction and other novel structural features not shown in the prior art.

U.S. Pat. No. 4,226,177 discloses a portable grilling device of the foldable type including a first bowl and a second bowl hingedly connected together. The bowls are movable between a closure position where the bowls overlie one another, a generally right angular use position where the second bowl is disposed substantially normal to the first bowl, and a generally horizontal use position where the first bowl and the second bowl are fully opened. This grilling device does not provide electric heating elements or an exhaust fan as featured in the present invention.

Another example of a folding grill apparatus is described in U.S. Pat. No. 4,475,528 which discloses a portable cooking apparatus constructed so that the disassembled parts may be fitted together for easy and convenient storage and transport. This portable cooking apparatus also does not provide electric heating elements or an exhaust fan in the manner of the present invention.

While these devices fulfill their respective, particular objectives and requirements, the aforementioned patents do not disclose the present inventive device. The present invention provides a foldable electric grill having novel structural features including an exhaust fan for indoor grilling and a grease collection tray.

SUMMARY OF THE INVENTION

Accordingly, the present invention is a portable electric grill constructed to permit its supporting frame to be folded from an open position wherein a pair of horizontally disposed grilling plates are supported by folding leg members to a closed condition in which the grilling plates pivot upwardly to a generally vertical position and the leg members fold up for convenient storage. The grill provides a pair of heating elements with individual thermostatic controls, which allow the grilling plates to be selectively energized. The present grill also includes an exhaust fan having an air filter for indoor cooking. The air filter is disposed within the air intake of the exhaust fan and utilizes filter media capable of capturing particulate matter of a size range typically encountered in smoke and cooking fumes generated by such a grill during use.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Those skilled in the art will appreciate that the conception upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
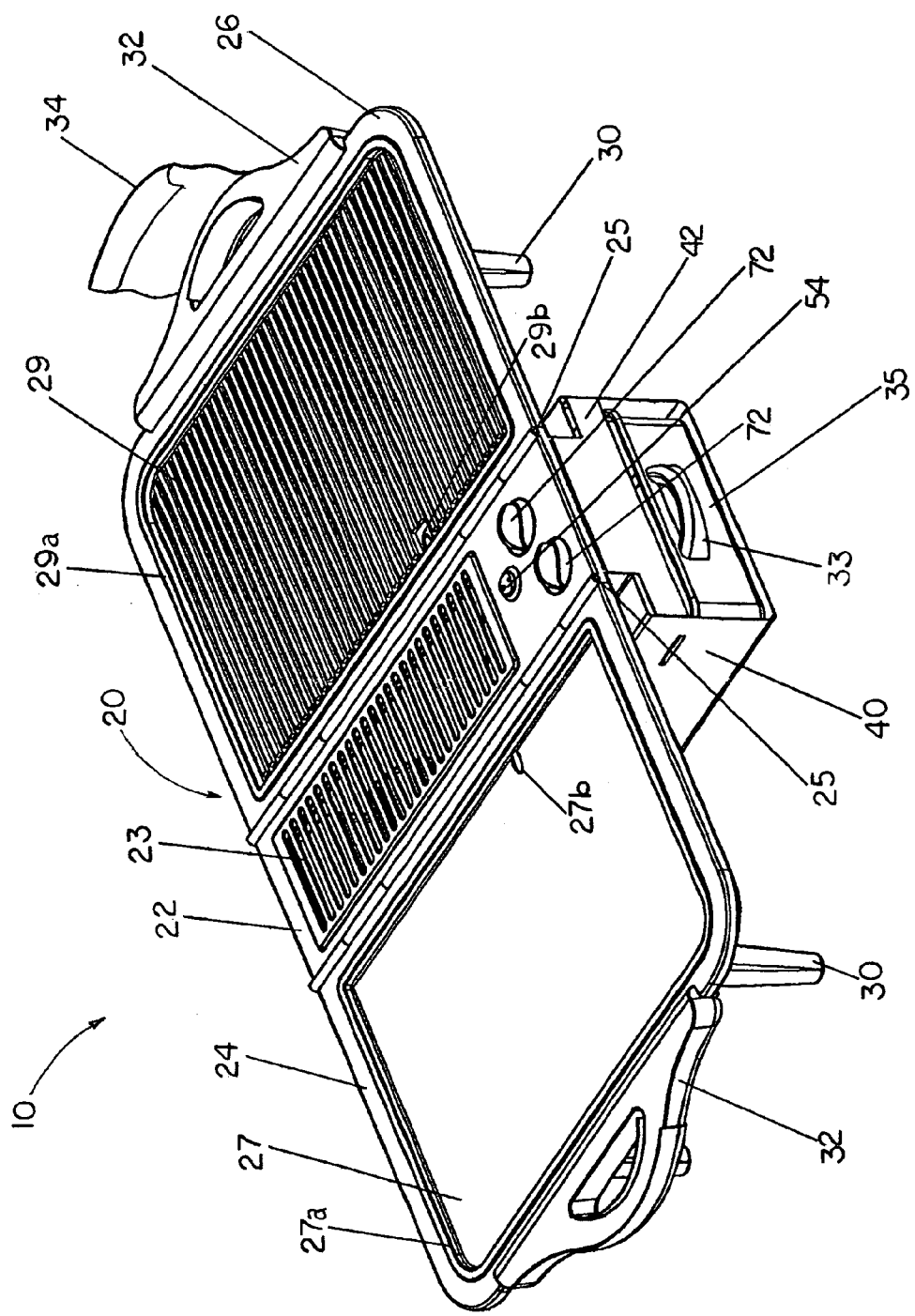
FIG. 1 is a perspective view of the present foldable grill in an unfolded position.

With further reference to the drawings there is shown therein a portable electric grill in accordance with the present invention, illustrated in FIG. 1 and indicated generally at 10. It will be understood that in FIG. 1 the present grill 10 is shown in an unfolded or open position ready for use.

Grill 10 includes a support frame assembly, indicated generally at 20, comprised of a central frame member 22, which is symmetrically disposed between a first frame member 24 and a second frame member 26. In the embodiment shown in FIG. 1, first frame member 24 is D-shaped in configuration defining a receptacle 24*a* (FIG. 5) wherein a mating D-shaped griddle plate 27 is received and supported.

Figure 5:
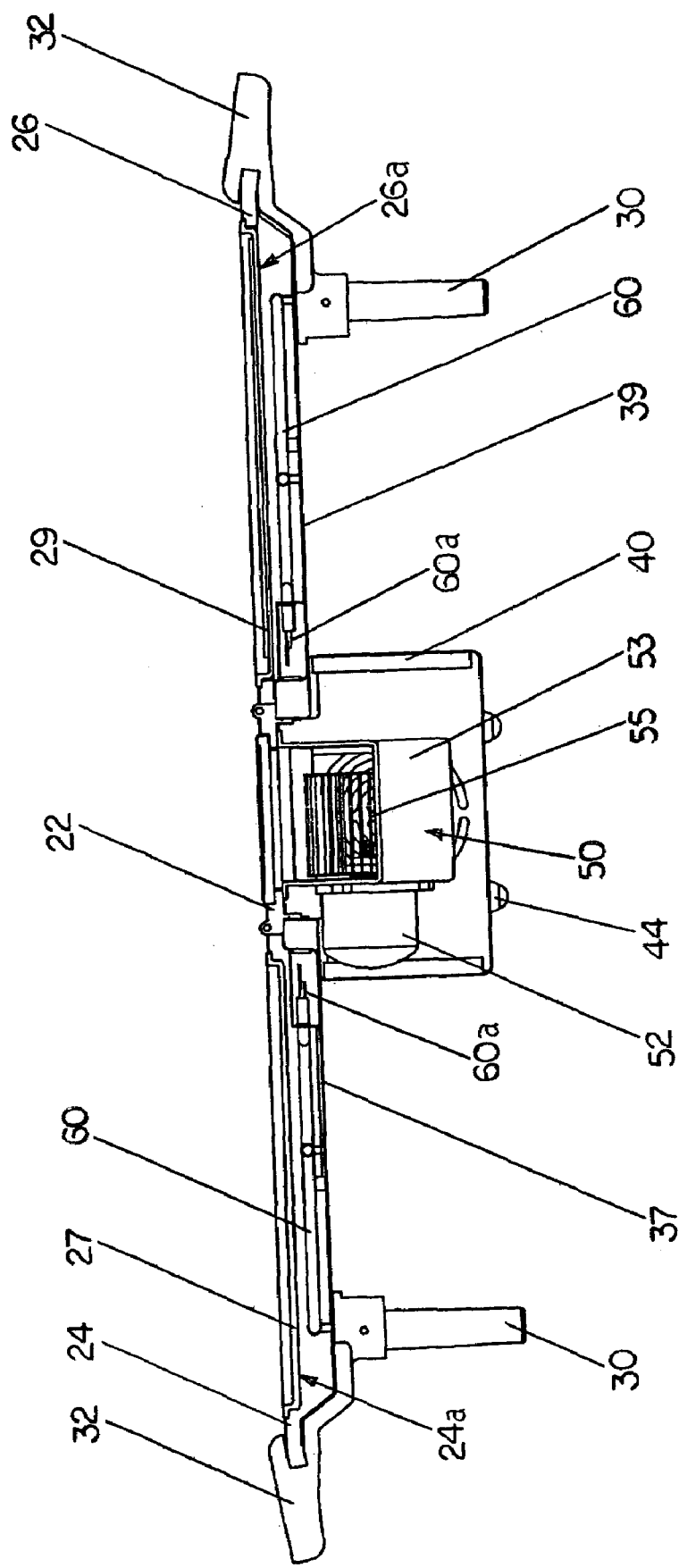
FIG. 5 is a cross-section of the present grill in an unfolded position.

Similarly, second frame member 26 is D-shaped in configuration defining a receptacle 26a (FIG. 5) wherein a mating grill plate 29 is received and supported. Griddle plate 27 and grill plate 29 and their associated frame members 24, 26 respectively are fabricated as unitary constructions (FIG. 1) or, alternatively, griddle plate 27 and grill plate 29 are constructed to be removable from frame members 24, 26 for cleaning purposes (FIG. 5).

Griddle plate 27 and grill plate 29 include raised peripheral edges 27a, 29a respectively which function to retain grease drippings from meats and other foodstuffs prepared thereon. Such grease drippings are delivered via integral drain tubes 27b, 29b formed in plates 27, 29 (FIG. 4) respectively to a drip tray 35 having a handle 33. Drip tray 35 is disposed in sliding relation to housing 40, which is attached to the underside of the frame member 22. This arrangement permits the grill 10 to be folded to its closed or vertical position (FIG. 2) without concern for spillage of grease drippings.

Frame members 22, 24, 26 are fabricated from sheet steel, aluminum, cast iron, or other suitable material and are provided in different exterior finishes such as powder coating, stainless steel, or plated steel.

Figure 2:
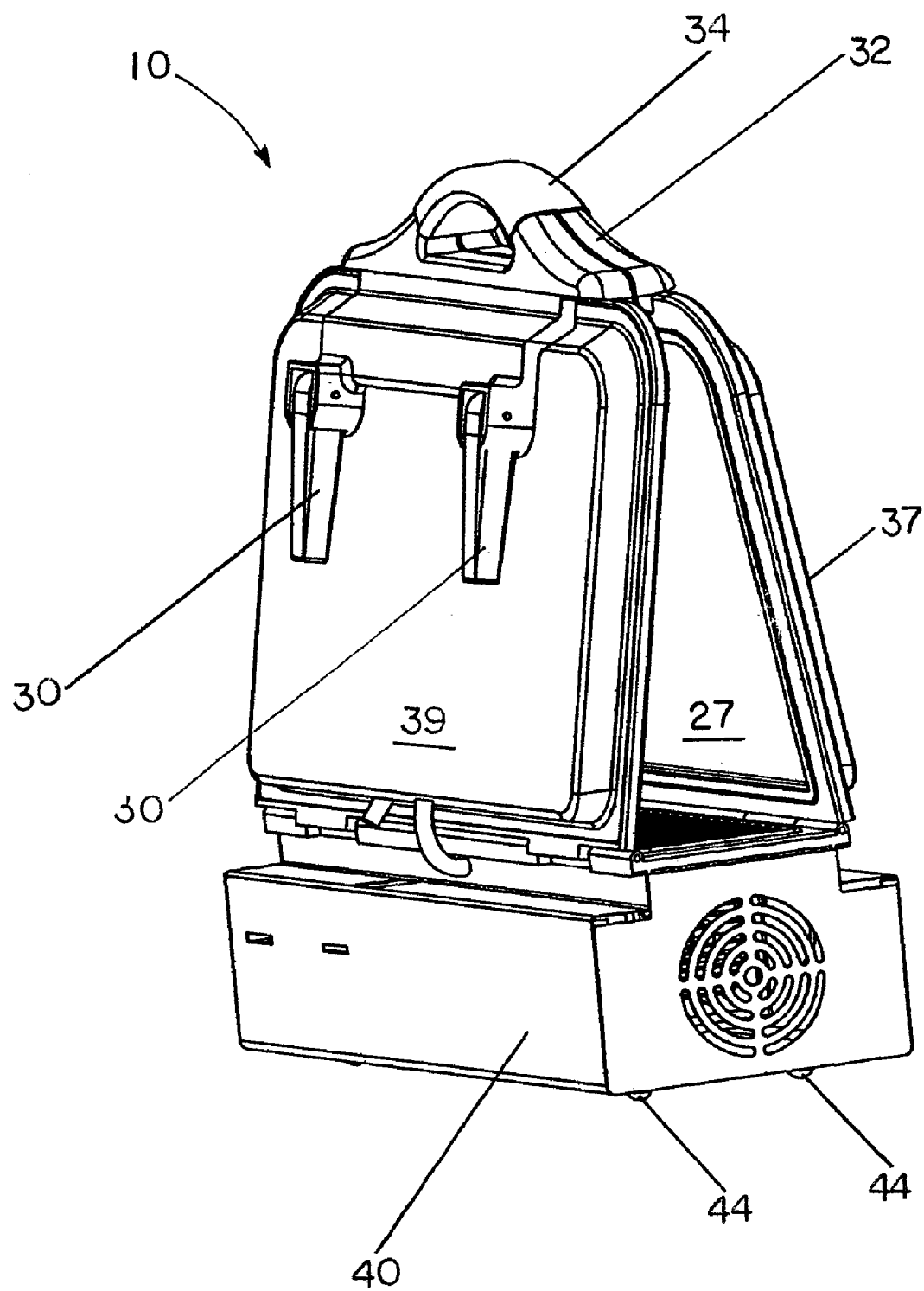
FIG. 2 is a perspective view of the present foldable grill in a folded position.

The support frame assembly 20 provides structures which comprise articulating means including, but not limited to, the following structures. In the embodiment shown in FIG. 1, frame members 24 and 26 are pivotally attached to frame member 22 by hinge pins 25. In this configuration the frame assembly 20 with the symmetrically disposed plates 27, 29 installed is foldable about the hinge pins 25 to a closed or folded condition as shown in FIG. 2. More particularly, it can be seen that frame members 24, 26 can be pivoted upwardly about hinge pins 25 to the generally vertical orientation shown.

Handles 32 are mechanically attached to frame members 24, 26 and interlock in the folded condition of the grill 10 being secured by a resilient handle lock 34, which snaps into position about the interlocked handles 32 (FIG. 2).

As shown in FIG. 1 frame assembly 20 is supported in its open condition by folding leg members 30, which are pivoted and folded inwardly about the pins 31 against the bottom covers 37, 39 of the grill 10 for convenient transport and storage in its folded condition (FIG. 2). Leg members 30 are fabricated from steel, cast iron, aluminum, heat-resistant composites, or other suitable materials.

Figure 3:
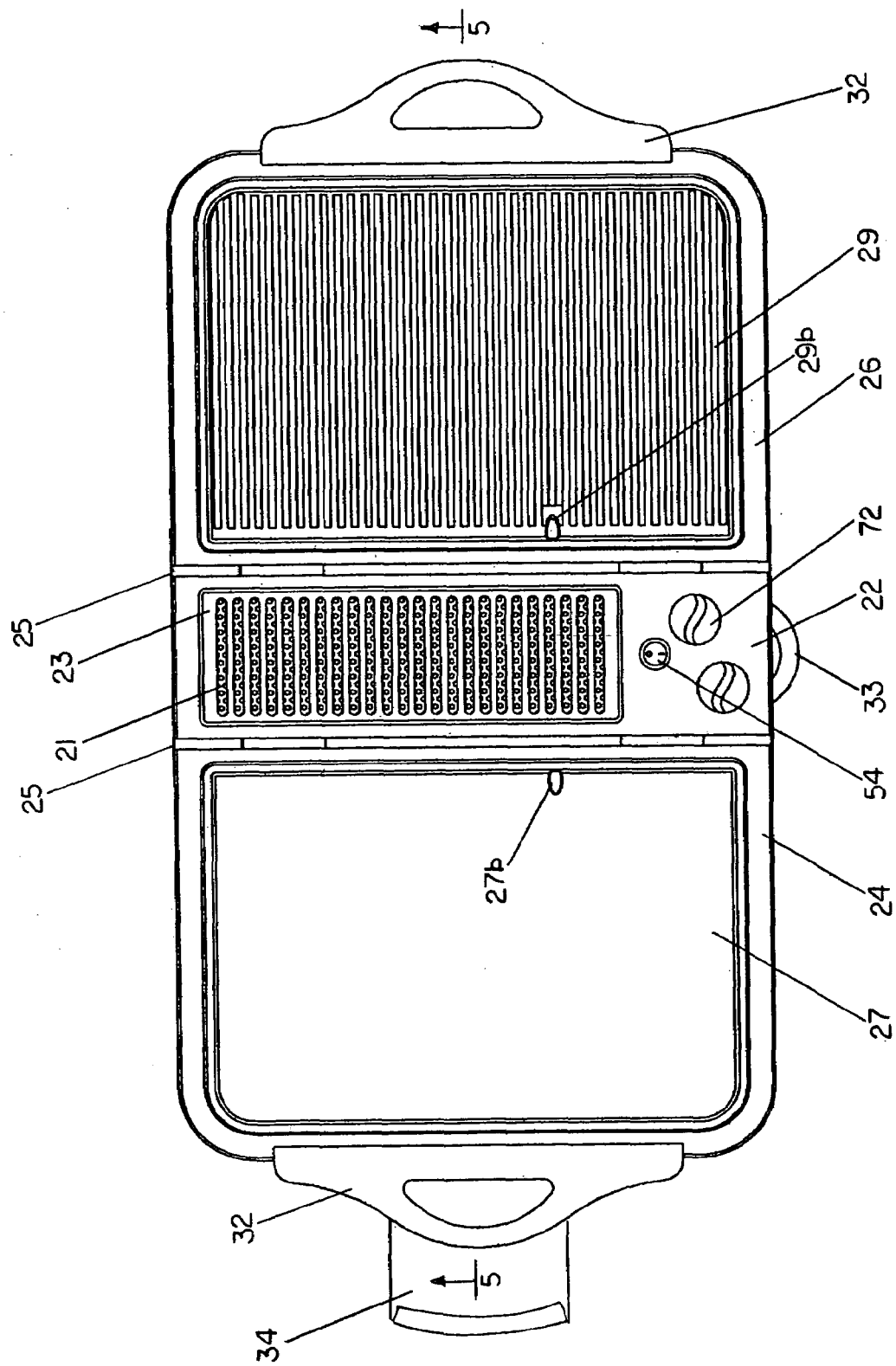
FIG. 3 is a top plan view of the present grill in an unfolded position.

Advantageously, frame member 22 includes a removable vent plate 23 wherein an air filter 21 is disposed (FIG. 3). The media utilized in the air filter 21 is the physical mechanism for controlling smoke and cooking fumes to permit indoor use of the grill 10. The media in the air filter 21 ranges from metallic fibers, synthetic fibers, cellulose fibers, and/or multilayer media designed to capture particulate matter of a size range typically encountered in smoke and cooking fumes generated by the present grill 10.

Figure 4:
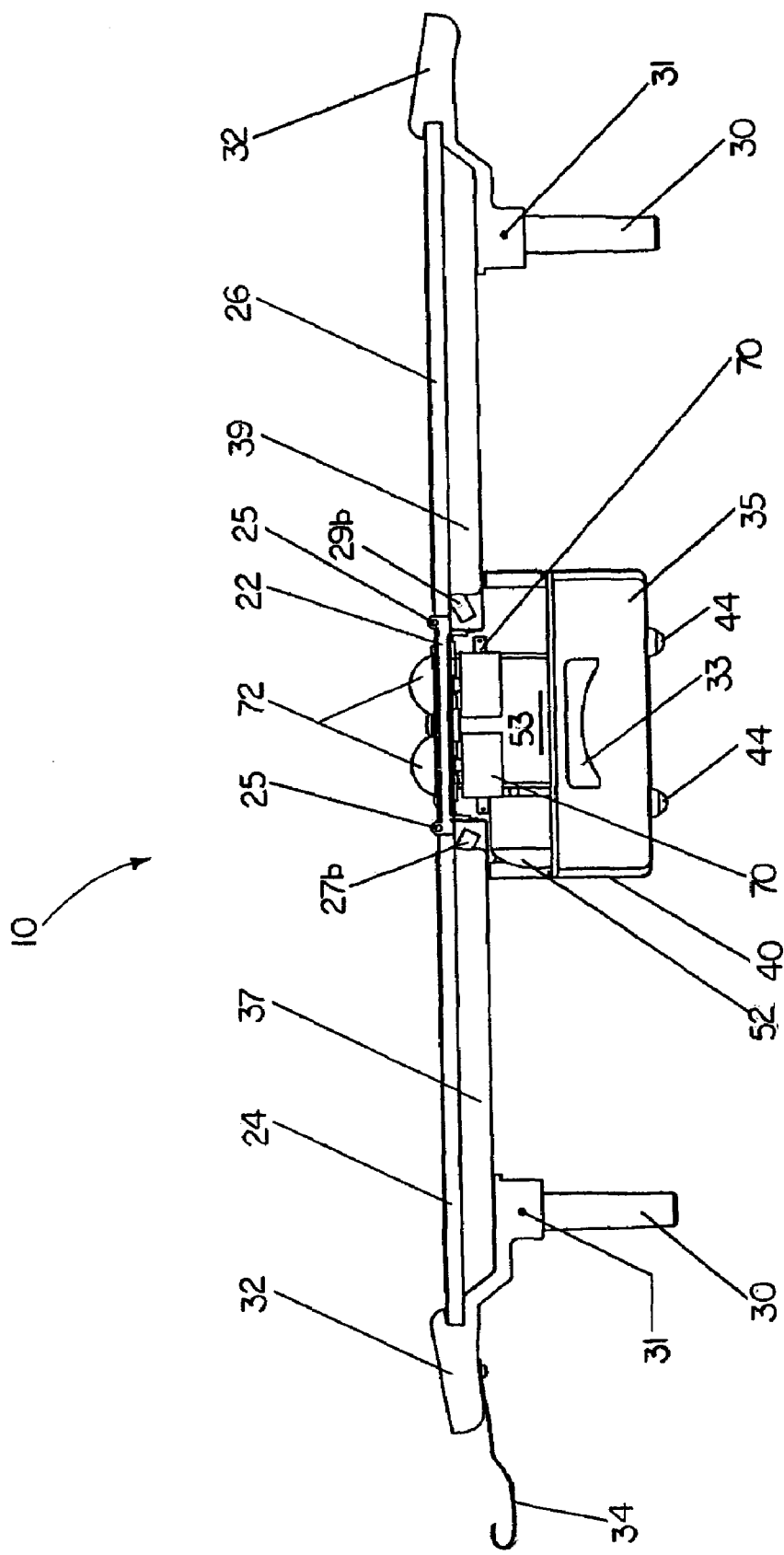
FIG. 4 is a front elevation of the present grill in an unfolded position.

Referring to FIG. 4 there is shown a front elevation of grill 10 in an unfolded position with the front panel 42 (FIG. 1) of the housing 40 removed to show the interior thereof Housing 40 is provided with a plurality of feet 44 (FIG. 2), which support grill 10 on a countertop or other suitable surface.

Housing 40 encloses an exhaust fan assembly, indicated generally at 50, including a circular fan 55 enclosed within a fan hood 53 (FIG. 5). An intake end 53a of fan hood 53 is positioned adjacent vent plate 23 such that fan 55 draws smoke and cooking fumes generated during use across the plates 27, 29 and through the filter element 21 into the fan 55. Fan 55 propels this flow of filtered air through the exhaust vent 49 (FIG. 7) at the rear of the housing 40 and into the atmosphere. Fan 55 is coupled to a fan motor 52, which is electrically connected to a standard 110 volt power source 79 (FIG. 8) via On/Off switch 54.

Figure 6:
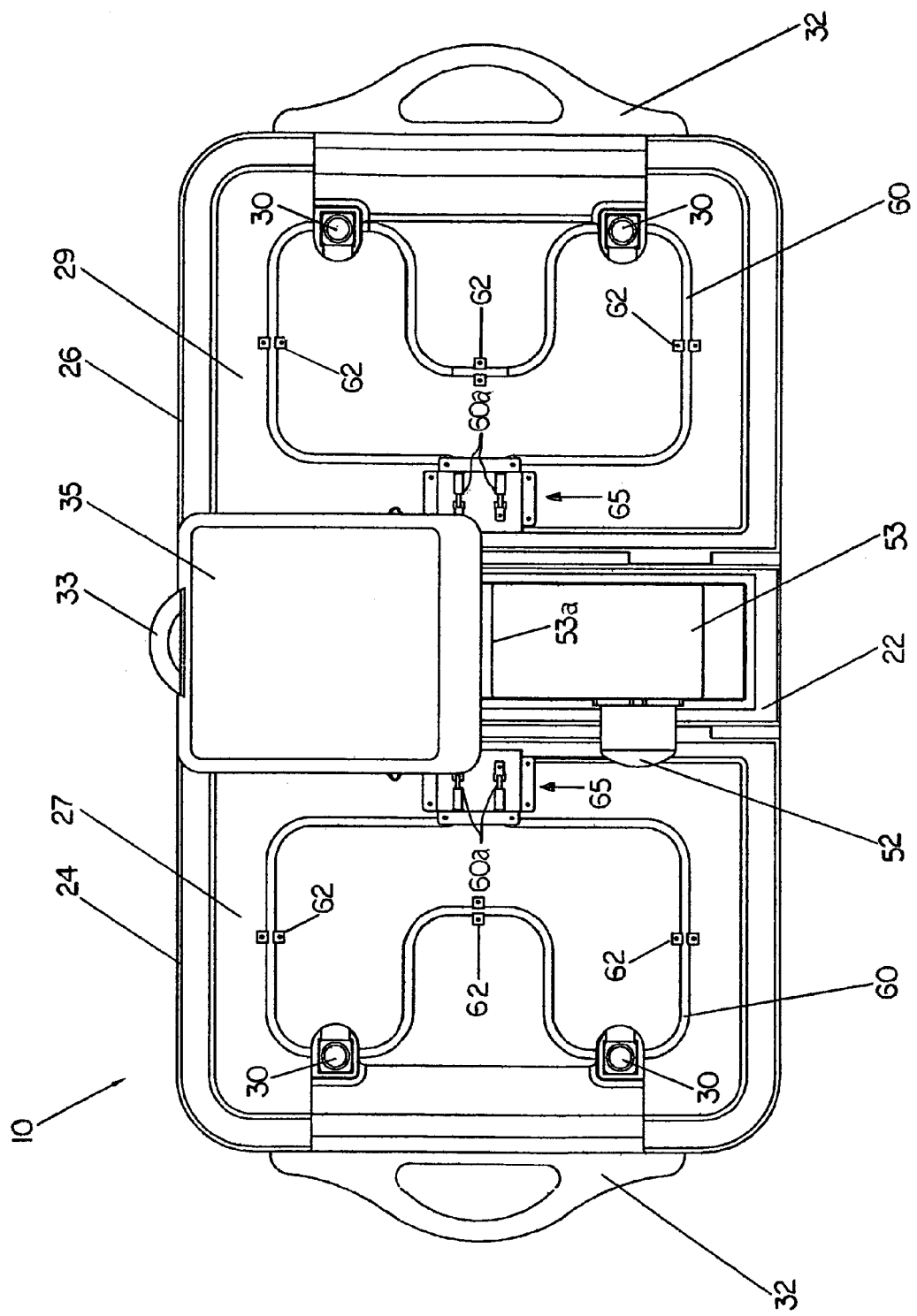
FIG. 6 is a bottom plan view of the present grill in an unfolded position.

The present grill 10 is also provides structures which comprise heating means including, but not limited to, the following structures. Referring to FIG. 6 it can be seen that heating elements 60 are attached to the underside of griddle plate 27 and grill plate 29, which are constructed from a highly heat conductive material such as cast aluminum, cast iron, steel, or other suitable material for efficient heat transfer.

In the embodiment shown in FIG. 6 heating elements 60 are constructed of stainless steel tubing or other suitable tubing wherein a resistance heater wire (not shown) is enclosed. Heating elements 60 are attached in the positions shown in FIG. 6 to plates 27, 29 respectively by retaining clips 62. The terminal ends 60a of heating elements 60 are each received within terminal box, indicated generally at 65, wherein the heating elements are electrically interconnected to their respective temperature controls.

Figure 7:
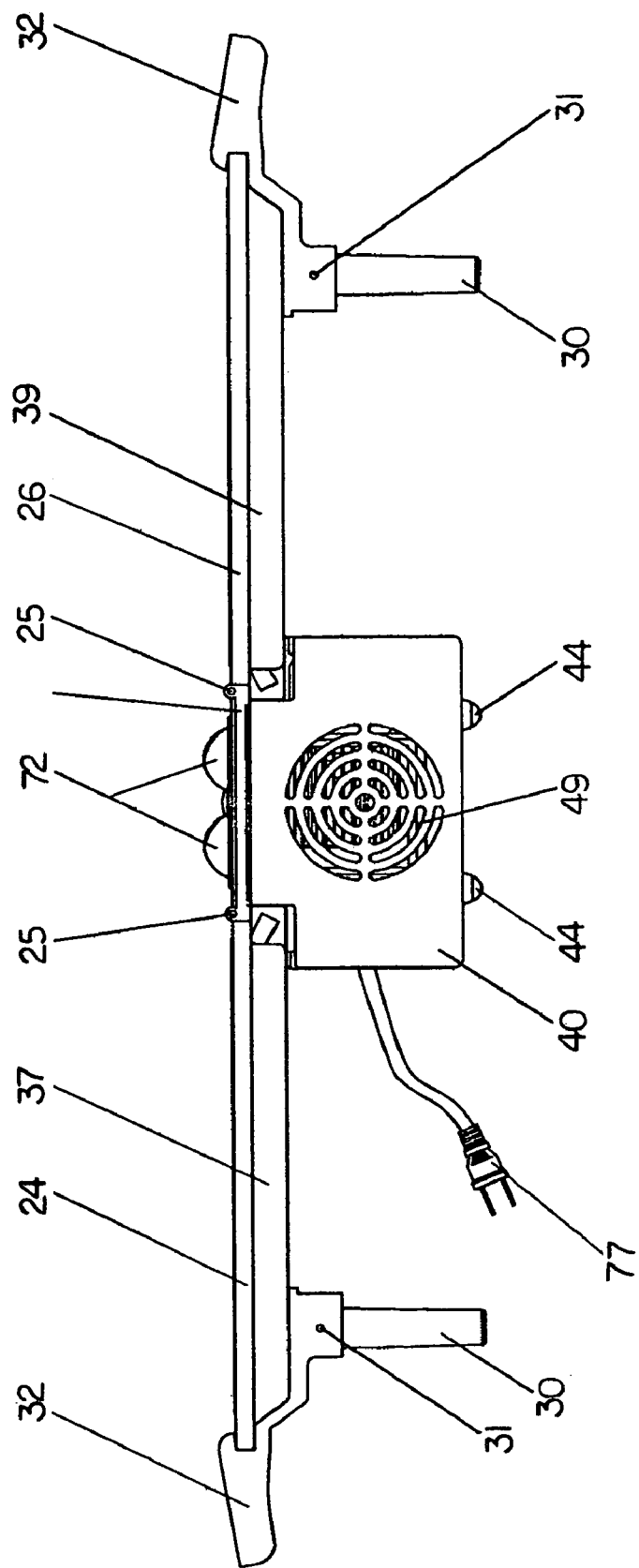
FIG. 7 is a rear elevation of the present grill in an unfolded position.

The present grill 10 also provides structures which comprise temperature controlling means including, but not limited to, the following structures. Each heating element 60 is electrically connected to its respective temperature controller 70 and, in turn, to a power source 79 (FIG. 8) by wiring via power cord 77 (FIG. 7). Each temperature controller 70 comprises a thermostat, which can be actuated by control knobs 72 independently of each other to selectively energize the heating elements 60.

Figure 8:
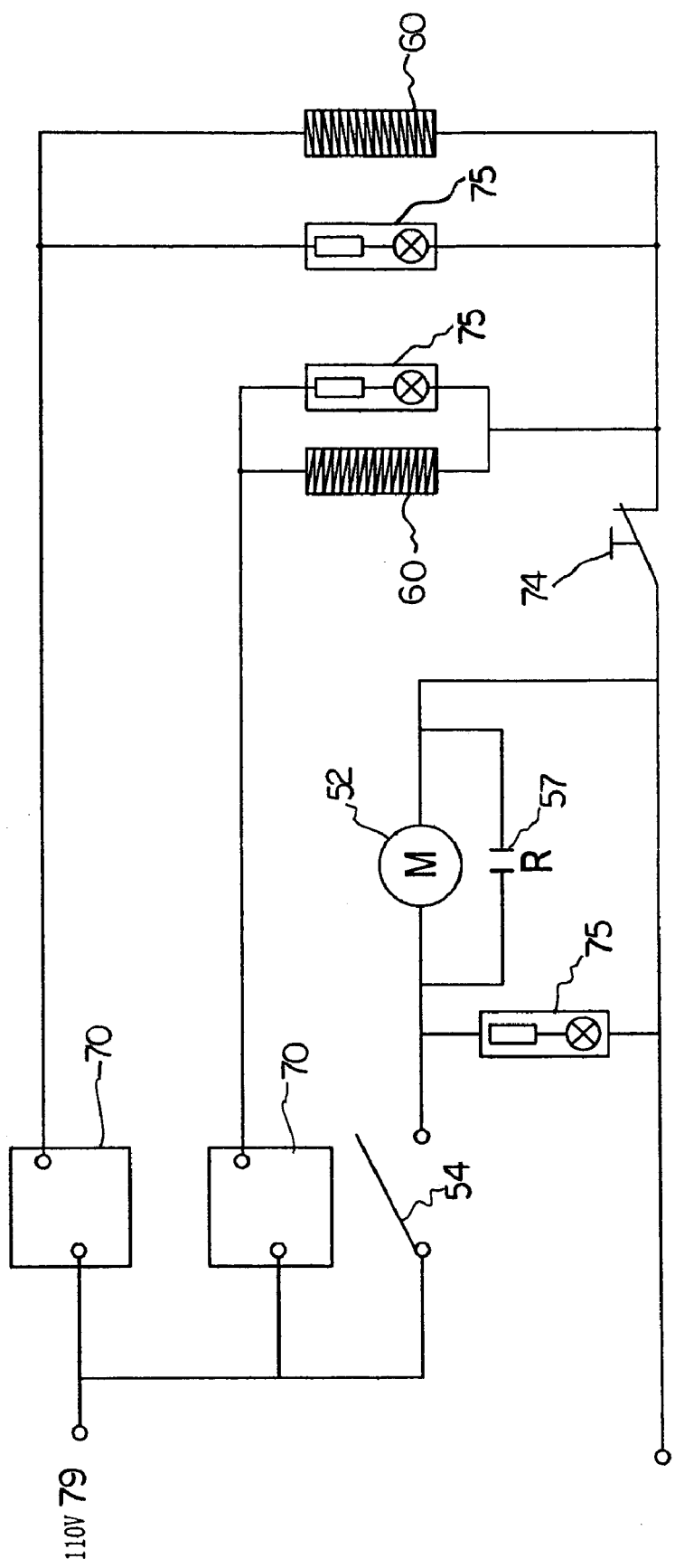
FIG. 8 is an electrical schematic showing the components and circuitry of the present grill.

Referring to FIG. 8 there is shown therein a schematic representation of the electrical components and circuitry of the present grill 10 including the temperature controllers 70, the heating elements 60, fan motor 52 with start capacitor 57, On/Off switch 54, and their associated circuitry. It can be seen that the electrical components include a temperature limiting device 74 which prevents the heating elements 60 from exceeding a predetermined temperature for safety reasons. Indicator lights 75 are electrically connected to fan motor 52 and heating elements 60 being illuminated when the fan motor and heating elements are in operation.

Grill 10 is designed for use with a standard 120 volt, 60 Hz power source. In the embodiment shown heating elements 60 are designed to operate in the range of 1200-1500 watts. Of course, this wattage rating may vary for a given application and capacity of the grill 10.

In operation the grill 10 is unfolded to the position shown in FIG. 1 and the On/Off switch 54 is turned "On" to pass the flow of electric current to the temperature controllers 70 and the fan motor 52 illuminating indicator lights 75. Thereafter, control knobs 72 are used to regulate the flow of electric current from the power source 79 via temperature controllers 70 to the heating elements 60 for grilling foodstuffs.

After use is complete the grill 10 is folded to the position shown in FIG. 2 and the handle lock 34 is applied permitting convenient handling and storage. In this position it will be appreciated that grease drippings flow by gravity via drain tubes 27b, 29b into drip tray 35 for collection. Griddle plate 27 and grill plate 29 are detachable for cleaning and storage.

Although not specifically illustrated in the drawings, it should be understood that additional equipment and structural components will be provided as necessary and that all of the components described above are arranged and supported in an appropriate fashion to form a complete and operative foldable electric grill incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A portable electric grill comprising:
a housing having an intake vent and an exhaust vent;
a foldable frame assembly attached to said housing, said frame assembly including a first frame member and a second frame member, wherein said first frame member and said second frame member are each connected to said housing by articulating means enabling said frame assembly to be shifted from an open position to a closed position;
a plurality of grilling plates disposed within said foldable frame assembly, wherein said grilling plates are arranged in juxtaposition to said intake vent;
an exhaust fan disposed in said housing in fluid communication with said intake vent and said exhaust vent, wherein said fan draws cooking gases produced by said grilling plates into said intake vent;
heating means disposed in proximity to each of said grilling plates for efficient heat transfer; and
temperature controlling means electrically interconnected with said heating means.

2. The portable electric grill of claim 1 wherein said intake vent includes an air filter therein.

3. The portable electric grill of claim 1 wherein said housing includes a removable drip tray for collecting grease drippings.

4. The portable electric grill of claim 3 wherein said grilling plates each include an integral drain tube extending therethrough for delivering said grease drippings to said drip tray.

5. The portable electric grill of claim 1 wherein said foldable frame assembly includes a first frame member and a second frame member, each of said frame members defining receptacles wherein said grilling plates are disposed.

6. The portable electric grill of claim 5 wherein said grilling plates are detachable from said frame members.

7. The portable electric grill of claim 1 wherein said frame assembly includes a plurality of folding leg members attached thereto for supporting said grill in said open position thereof, said folding leg members being retracted in said closed position.

8. The portable electric grill of claim 1 wherein each of said frame members includes a handle attached thereto, said handles being disposed in face-to-face relation in said closed position.

9. The portable electric grill of claim 8 wherein at least one of said handles includes a handle locking mechanism to secure said handles together retaining said grill in said closed position.

10. The portable electric grill of claim 1 wherein said heating means includes at least one tubular resistance heating element disposed in contact with each of said grilling plates.

11. The portable electric grill of claim 10 wherein said temperature controlling means include a thermostatic control device electrically connected to each heating element.

12. The portable electric grill of claim 11 wherein said temperature controlling means includes a temperature limiting device to prevent said heating elements from exceeding a predetermined temperature.

13. An improved electric grill of a type having a housing including an intake vent and an exhaust vent, an exhaust fan disposed in said housing in communication with said intake vent and said exhaust vent, at least one grill plate, at least one heating element disposed in contact with said at least one grill plate, and a temperature controller electrically connected to said at least one heating element, wherein the improvement comprises:
a foldable frame assembly for supporting said at least one grill plate, said frame assembly being connected to said housing by articulating means enabling said frame assembly to be shifted from an open position to a closed position of said grill, wherein said at least one grill plate is juxtaposed to said intake vent enabling said fan to exhaust cooking fumes in order to facilitate indoor grilling.

14. An improved electric grill of claim 13 wherein said foldable frame assembly includes a first frame member and a second frame member, said first frame member and said second frame member each defining a receptacle wherein said at least one grill plate is disposed.

15. An improved electric grill of claim 14 wherein said at least one grill plate is detachable from said frame members.

16. An improved electric grill of claim 13 wherein said frame assembly includes a plurality of folding leg members attached thereto for supporting said grill in said open position thereof, said folding leg members being retracted in said closed position thereof.

17. An improved electric grill of claim 13 further including an air filter disposed within said intake vent.

18. An improved electric grill of claim 13 wherein said housing includes a removable drip tray for collecting grease drippings.

19. An improved electric grill of claim 18 wherein said at least one grill plate includes an integral drain tube extending therethrough for delivering said grease drippings to said drip tray.

20. An improved electric grill of claim 14 wherein each of said frame members includes a handle attached thereto, said handles being interlocked in said closed position.

21. An improved electric grill of claim 20 wherein at least one of said handles includes a handle locking mechanism to secure said handles together retaining said grill in said closed position.

22. An improved electric grill of claim 13 further including tubular resistance heating elements disposed in proximity to said at least one grill plate.

23. An improved electric grill of claim 22 further including thermostatic control devices electrically connected to each of said heating elements.

24. An improved electric grill of claim 23 wherein each of said thermostatic control devices is electrically connected to a temperature limiting device to prevent said heating elements from exceeding a predetermined temperature.

* * * * *